United States Patent [19]

Beaman

[11] 4,054,744
[45] Oct. 18, 1977

[54] SEAL FOR AN INSTRUMENT PROBE ASSEMBLY

[75] Inventor: Norman Vane Beaman, La Habra, Calif.

[73] Assignee: Robertshaw Controls Company, Richmond, Va.

[21] Appl. No.: 757,869

[22] Filed: Jan. 10, 1977

[51] Int. Cl.² .................. H01G 7/00; H01B 17/30
[52] U.S. Cl. .................................. 174/151; 277/4;
277/37; 73/304 C; 324/61 P; 138/149
[58] Field of Search ............... 324/72.5, 149, 158 P,
324/61 P, 65 P; 277/35, 12, 4, 37, 114, 228, 229,
233; 138/125, 126, 137, 140, 149; 73/304 C;
174/151, 152 R, 152 G

[56] References Cited
U.S. PATENT DOCUMENTS

| 2,091,824 | 8/1937 | Lewis | 174/151 |
|---|---|---|---|
| 3,109,882 | 11/1963 | Maltby | 174/151 |
| 3,491,799 | 1/1970 | Foll | 138/137 |
| 3,774,108 | 11/1973 | Ogilvie | 324/72.5 X |
| 3,831,069 | 8/1974 | Merrell et al. | 73/304 C X |
| 3,843,832 | 10/1974 | Petersen et al. | 174/151 |

FOREIGN PATENT DOCUMENTS

| 1,648,163 | 4/1970 | Germany | 73/304 C |
|---|---|---|---|
| 1,593,529 | 7/1970 | France | 277/4 |

Primary Examiner—Robert S. Ward, Jr.
Attorney, Agent, or Firm—Fulwider, Patton, Rieber, Lee & Utecht

[57] ABSTRACT

There is disclosed an instrument probe assembly having a positive seal to prevent invasion of process fluids into the cavity of the assembly body. The instrument probe assembly comprises an elongated probe member which projects from a through passageway of the assembly body. The latter has attachment menas, typically pipe threads, at one end to permit it to be seated in an aperture of a process vessel, typically a pressure vessel. The elongated probe which projects from the assembly body into the vessel is commonly used as a capacitance sensing probe to determine the level of liquids or granular solids within the vessel. The probe assembly of this invention includes a sleeve projection from the inboard face of the assembly body, surrounding the projecting elongated probe member and a laminated sleeve formed of an inner sleeve of thermoplastic resin and an outer sleeve of heat shrinkable plastic which overlies the annular joint between the assembly body sleeve and the probe member and which is thermally applied, effectively sealing this annular joint against invasion of process fluids into the assembly body.

7 Claims, 5 Drawing Figures

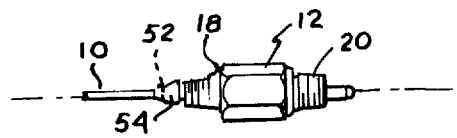
FIG. 5
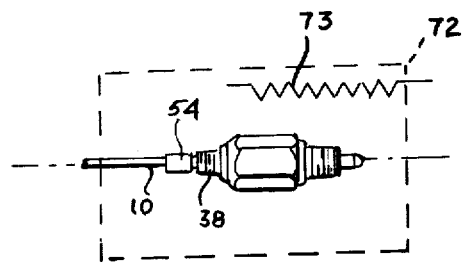
FIG. 4
FIG. 1
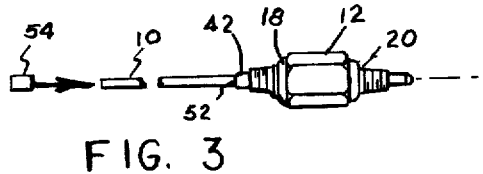
FIG. 3
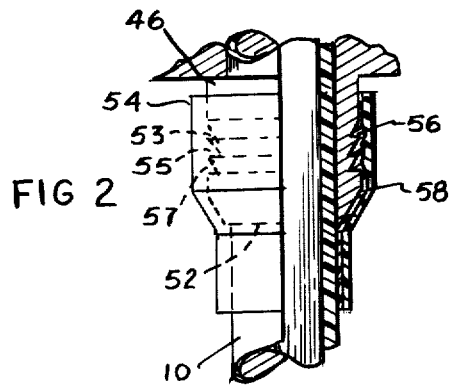
FIG. 2
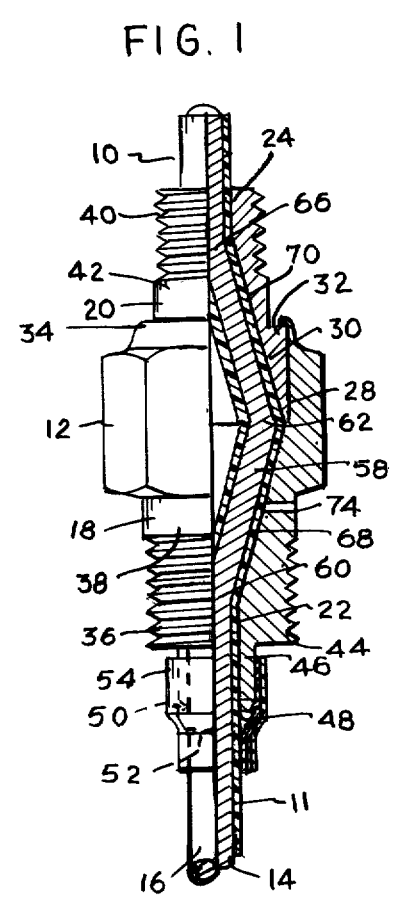

SEAL FOR AN INSTRUMENT PROBE ASSEMBLY

BACKGROUND OF THE INVENTION

1. Field of the Invention

This invention relates to an instrument probe assembly and, in particular, to an improved sealed probe assembly.

2. Brief Statement of the Prior Art

Instrument probe assemblies are commonly employed for capacitance measurement of levels of liquids or granular solids in process vessels comprise an elongated probe member received within, and electrically isolated from, an assembly body. The assembly body has attachment means, typically an end gland bearing conventional pipe threads to permit its insertion into an aperture of a process vessel with the elongted probe member projecting therefrom into the interior of the vessel. The probe assemblies are often employed in pressure vessels and the superatmospheric pressure encountered can cause the process fluids to invade the cavity of the assembly body, destroying the electrical insulation between the probe and body and requiring servicing of the assembly.

BRIEF STATEMENT OF THE INVENTION

This invention comprises an instrument probe assembly having an improved seal between the elongated probe member and the supporting structure of the assembly body. The elongated probe member is received within a through passageway of the assembly body which is provided, at its opposite ends, with means such as pipe threads or flanges to permit its mounting in an aperture of a pressure vessel and permitting the attachment of an electrical junction box to its opposite end. The assembly body bears, on its inboard face, a body sleeve which projects about the elongated probe member forming an annular joint therebetween.

The seal of the invention comprises a laminate sealing sleeve which overlies the aforementioned annular joint and the contiguous regions of the body sleeve and probe member. The sealing sleeve is formed of an inner sleeve of a thermoplastic resin which is encased in an outer sheathing of a heat shrinkable plastic. The sealing sleeve is thermally shrunk on the assembly and the thermoplastic inner sleeve intrudes into a tight sealing configuration about the encased members. In the preferred embodiment, the body sleeve has a plurality of peripheral grooves which receive intruded thermoplastic material. The aforedescribed seal is particularly effective for use in pressure vessels since the application of superatmospheric pressure to the sealing sleeve reinforces the tightness of the seal.

DESCRIPTION OF THE DRAWINGS

The invention will be described with reference to the illustrated preferred embodiments of which:

FIG. 1 is a partial section view of a typical probe assembly having the improved seal of the invention;

FIG. 2 is an enlarged view of the sealed region of the probe assembly; and

FIGS. 3-5 illustrate the method of manufacture of the sealed instrument probes of the invention.

DESCRIPTION OF PREFERRED EMBODIMENTS

Referring now to FIG. 1, the invention is illustrated as an instrument probe assembly of an elongated probe member 10 and an assembly body 12. The probe member 10 has a core 14 of a suitable electrically conductive material, e.g., metal, and is covered by an unbroken and continuous cotaing 16 of a dielectric material.

The portion 11 or probe 10, which projects into the process vessel, includes metal core 14 which can optionally be bare or can be covered with the dielectric material coating 16. In some applications, a concentric metal sheath can be installed over the exiting portion of probe 10. The metal core 14 is the sensing electrode of the capacitance instrument.

The assembly body 12 is formed of a first member 18 and a second member 20. The first and second members have through openings 22 and 24, respectively, which define a continuous through passageway in the assembly body 12. The first member 18 has a large diameter counterbore 28 to receive the inboard end 30 of the second member 20. The received portion 30 of the second member 20 is of larger diameter to provide an external, annular shoulder 32 which is received with counterbore 28 and a thin peripheral lip 34 of the first member 18 is rolled about shoulder 32, securing the assembly.

The first member 18 bears attachment means for removeably securing the assembly body in the aperture of a process vessel, such as a pressure vessel. The particular means illustrated compries external pipe threads 36 on the gland end 38 of first member 18. Similar attachment means in the form of external thread 40 can be provided on the shank portion 42 of the second member whereby an electrical junction box and the like can be mounted on this member.

In accordance with this invention, the face 44 of the gland end 38 bears a body sleeve 46. This body sleeve extend coaxially with the projecting portion 11 of probe member 10 and is preferably an integral extension of the gland end 38. The distal edge 48 of sleeve 46 is bevelled at an angle from 20° to about 45°, typically about 30°, and bears peripheral groove means 50. The body sleeve 46 terminates against the projecting portion 11 or probe 10 in a line joint 52. A sealing sleeve 54 is provided about the probe 10 to overlie joint 52 and the contiguous portions of probe 10 and body sleeve 46.

Referring now to FIG. 2, the details of the sealing sleeve 54 and cooperative body sleeve 46 will be described. As illustrated, sealing sleeve 54 is a laminate sleeve formed of an inner sleeve 56 of thermoplastic material encased within an outer sheathing 58 of a heat shrinkable plastic. The sealing sleeve 54 is applied over joint 52 and contiguous portions of the probe member 10 and body sleeve 46 and is heated in this position to shrink the assembly into a very tight sealing engagement to the received members. The bevelled distal edge of body sleeve 46 facilitates the accommodation of the sealing sleeve 54 to the assembly by avoiding any sharp corners and the like which could cause sealing problems or undue stress on the sealing sleeve 54. The peripheral groove means 50 is, preferably, a plurality of tapered grooves 53, 55 and 57 which have a sharp trailing edge and an inclined sidewall to permit entrusion of the thermoplastic material 56 during the thermal application of the sealing sleeve.

The heating of the sealing sleeve 54 after its application is sufficient to soften or melt the thermoplastic material of the inner sleeve 56 such that the simultaneous shrinking of heat shrinkable casing 58 will cause the thermoplastic material to deform closely to the contour of the received elements, intruding into the grooves 53, 54 and 57 to provide a very tight and secure seal.

Referring now to FIG. 1, the instrument probe assembly preferably has a construction which securely retains probe 10 within the assembly body 12 without disrupting or breaking the continuity of the dielectric material coating 16. This is accomplished by providing a bent portion 58 in the probe member 10 and receiving the bent portion 58 within the assembly body 12. The bent portion is formed with a first, radially deflected bend 60, a reversing radially deflecting bend 62 and a straightening bend 66 to permit the probe member 10 to project from opposite ends of body 12 along the same general direction, preferably along a common axis whereby the projecting portions are generally coaxial. The through passageway of body 12 is provided with a radially deflecting, axial groove such as groove 68 in body member 18 and communicating groove 70 in body member 20 to receive the bent portion 58 of the probe member 10. The through passageway of the assembly body 12 can be provided with a passageway 74 communicating exteriorly of the assembly body 12 to provide drainage of any process fluids that could invade the interior of the assembly body.

The sealing means of the probe assembly of the invention provide substantially complete insurance against invasion or process fluids into the cavity of the assembly body 12. The gland end 38 of the assembly body is turned into an internally threaded aperture of a pressure vessel and the sleeve 46 with its dependent sealing sleeve 54 projects interiorly from the vessel wall. In this deployment, the sealing sleeve 54 is surrounded by the high pressure process fluids and the sealing sleeve is compressed against the faces of the received elements with ever increasing force at the interior pressure of the vessel increases. The tapered distal edge 48 of the body sleeve 46 cooperates to insure continuity of the sealing sleeve 54. The contour of this distal portion provides for a gradual transition from the lesser diameter probe member 10 to the larger diameter of body sleeve 46 without providing any regions of stress concentration of sealing sleeve 54 at it most acute location, i.e., in the vicinity of the annular line joint 52 between these elements.

The projectile curb means of the instrument assembly, i.e., bent portion 58 received with the assembly body 12, likewise provides an assembly of improved characteristics. The bent portion 58 insure against the forced ejection of the probe member 10 from the assembly body 12 under the superatmospheric pressure encountered within a process vessel.

The bent portion 58 also provides torsional engagement of probe 10, thereby securing the probe against twisting or turning in the assembly body, This prevents incorrect alignment of the probe in the process vessel during its installation and twisting during use.

In contrast to various prior art retainer rings and the like, the probe 10 in the assembly of this invention bears a continuous or unbroken coating of dielectric material coextensive with the entire length of probe member 10 received within the housing body 12. This construction avoids essentially all possibility of unintentional electrical grounding between the metal sensing core 14 and the body 12 of the assembly. In the event that process fluids may invade the cavity of the assembly body under the superatmospheric pressures that can be encountered by the assembly, the exposure of bent portion 58 of the probe 10 to such received fluids will not present any more severe exposure than encountered by the projecting portion 11 of the probe member, since the bent portion 58 is, likewise, entirely encased within an unbroken coating of dielectric material.

The sealing sleeve 54 is preferably formed of chemically inert plastics such as various halogenated polymers. A preferred and commercially available material for this purpose is marketed under the name Penntube WTF by Penntube Plastics Inc., Madison Avenue and Holly Street, Clifton Heights, Pa. This product has an outer sheath formed of heat shrinkable Teflon TFE with the inner sleeve formed of thermoplastic FEP. Telflon TFE is, of course, poly(tetrafluoroethylene), a chemical renouwned for its chemical inertness. The FEP resin used for the inner sleeve 56 is a copolymer of tetrafluoroethylene and hexafluoropropylene wherein the hexafluoropropyhlene monomeric units are inserted along the poly(tetrafluoroethylene) chain, the dependent trifluoromethylene groups functioning to provide a lower melting temperature and lower viscosity to this polymer than those of the Teflon TEF resin employed for the heat shrinkable outer sleeve 58.

Referring now to FIGS. 3–5, the manufacture of the instrument assembly with the improved sealing means of the invention will be described. As there illustrated, the instrument probe assembly of body 12 and probe member 10 is preassembled before application of the sealing sleeve 54. The preassembly includes the being of the probe member 10 at the portion 58 to be received within the assembly body 12. The individual body members 18 and 20 are milled to provide the radially deflecting, axial groove 68 and 70 and the bent portion 58 of probe 10 is placed within these grooves, the body member 20 is inserted, and annular lip 34 is rolled about shoulder 32.

The resultant preassembly then receives sealing sleeve 54 which is slid over probe member 10 to overlie the annular line joint 52, and contiguous portions of body sleeve 46 and probe member 10. The assembly is heated sufficiently to raise the temperature of sealing sleeve 54 to a level which softens or melts the thermoplastic resin of inner sleeve 56 and causes heat shrinking of the outer sleeve 58. This can be accomplished with a variety of heating means including an oven 72 where the assembly is contacted by heated air and/or exposed to thermal radiation from a heating element 73 or a plurality of infrared lamps and the like. The resultant heating quickly raises the temperature of the probe elements with the metal portions such as end 38 and probe 10 transferring their heat to the sleeve 54, quickly raising the temperature of the sleeve 54 to the melting point of the inner sleeve 56 and the shrinking temperature of the outer sleeve 58. The heated probe assembly is then withdrawn from the oven and permitted to cool. The sealing sleeve 54 assumes the exterior contour of the internal elements in the manner illustrated in FIG. 5 to provide a very tight and secure seal about the peripheral line joint 52 and the contiguous portions of sleeve 46 and the probe member 10.

The invention has been described with reference to the illustrated, presently preferred embodiment thereof. It is not intended that the invention be unduly limited by this disclosure of the preferred embodiment. Instead, it is intended that the invention be defined by the elements of the apparatus, steps of the method and their obvious equivalents set forth in the following claims.

What is claimed is:

1. A sealed pressure fitting for mounting in an aperture of a pressure vessel which comprises:
   a body having a body gland end for insertion into said aperture and sealing and attachment means to secure said body in a fluid tight connection therein;
   a probe member projecting into said pressure vessel through an opening in the face of said body end received in said aperture;
   a body sleeve member projecting from said face of said body, concentric to and surrounding said probe member, and terminating thereabout to define and annular joint intermediate the projected length of said probe member; and
   sealing means overlying said annular joint and contiguous regions of said sleeve and probe members comprising a laminate sleeve having an inner, thermoplastic sleeve and a concentric, outer thermoplastic sleeve of heat shrinkable plastic of higher melt temperature than said inner sleeve, said laminate sleeve being thermally shrunk into sealing engagement with said sleeve and probe members about said annular joint.

2. The sealed pressure fitting of claim 1 wherein said sleeve member is an integral sleeve extension of said body.

3. The sealed pressure fitting of claim 2 wherein said sleeve member has peripheral groove means to receive instrusion of said inner thermoplastic sleeve.

4. The sealed pressure fitting of claim 2 wherein said sleeve member has a distal, bevelled edge.

5. The sealed pressure fitting of claim 2 wherein said groove means of said sleeve member comprises a plurality of peripheral grooves.

6. The sealed pressure fitting of claim 1 wherein said heat shrinkable plastic of said outer sleeve is a tetra(fluoroethylene) polymeric resin.

7. The sealed pressure fitting of claim 1 wherein said inner thermoplastic sleeve is formed of a copolymer of tetrafluoroethylene and hexafluoropropylene.

* * * * *